United States Patent Office 2,694,077
Patented Nov. 9, 1954

2,694,077

PRODUCTION OF HYDROXY DERIVATIVES OF METHACROLEIN DIMER

Harry A. Stansbury, Jr. and Howard R. Guest, South Charleston, W. Va., assignors to Union Carbide and Carbon Corporation, a corporation of New York No Drawing. Application February 19, 1952,
Serial No. 272,522

9 Claims. (Cl. 260—345.9)

This invention relates to the production from 2,5-dimethyl-2-formyl-3,4-dihydropyran (also known as alpha-methacrolein dimer) of certain novel and potentially useful hydroxy compounds, including 2,5-dimethyl-2-formyltetrahydropyran-5-ol; 2,5-dimethyl-2-hydroxyadipaldehyde; and 2,5-dimethyl-1,2,6-hexanetriol. The dialdehyde is a useful cross-linking agent; and the triol is useful in alkyd resin formulations. Certain esters of the triol are plasticizers for vinyl resins.

Acrolein dimer can be hydrated readily in the presence of a trace of an acid catalyst to form 2-hydroxyadipaldehyde. Alpha-methacrolein dimer, on the contrary, was reported to be very resistant to hydration. As emphasized in column 10 of the Whetstone Patent No. 2,479,283, compounds of this type having two alkyl groups attached to the dihydropyran ring, such as 2,5-dimethyl-3,4-dihydro-1,2-pyran-2-carboxaldehyde, are alleged to be highly resistant to the action of water containing catalytic amounts of acid. They are said to be, in general, highly stable to treatment with boiling water, and in some instances to be entirely resistant to treatment even with boiling 40% sulfuric acid.

According to the invention, the alpha-methacrolein dimer is reacted with water containing a small or catalytic amount of a mineral acid such as sulfuric acid, or a catalytic amount of a strong organic acid such as formic acid. The presence of an inert water-soluble solvent for the dimer hastens the reaction. The hydration proceeds best at temperatures within the range from about 0° C. to about 150° C. At temperatures below 0° C. the reaction is so slow that it is not commercially practicable. Temperatures above about 150° C. result in the formation of undesirable by-products due to the condensation of the aldehyde. Any strong water-soluble mineral acid such as sulfuric, hydrochloric or phosphoric acid, or a strong organic acid such as formic, mono-, di- and trichloroacetic acids and the corresponding bromoacetic acids, sulfoacetic acid, fumaric acid, maleic acid, oxalic acid, picric acid, p-toluene sulfonic acid, and acetic acid, can be used as catalyst. When using acetic acid, reaction temperatures above 120° C. and superatmospheric pressures are preferred.

A water-soluble inert solvent for the dimer and catalyst speeds up the hydration reaction by bringing the dimer, water and catalyst into solution. However, the use of an inert solvent is not necessary and the reaction proceeds in the presence of only the methacrolein dimer, water and the catalyst. Suitable water-soluble inert solvents useful in the process include dioxane, acetonitrile, acetone, the dimethyl and diethyl ethers of ethylene glycol, the diethyl ether of diethylene glycol, and the dimethyl ether of tetraethylene glycol.

In the hydration, water adds to the double bond of the dimer in two separate mechanisms whereby two different products concurrently are produced, according to the equations:

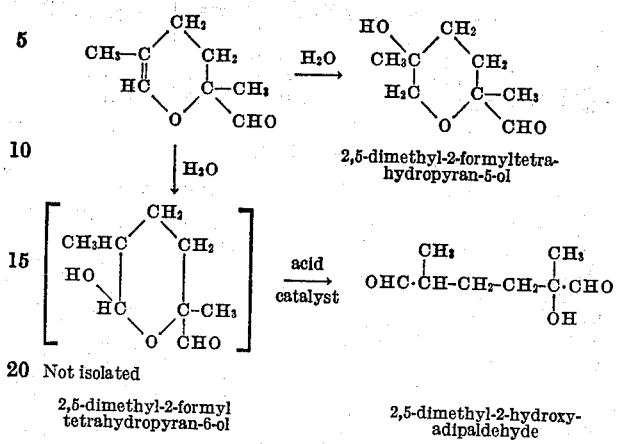

The hydration reaction mixture then is cooled, if necessary, and is neutralized with a dilute aqueous solution of a caustic alkali or the equivalent, such as sodium hydroxide, potassium hydroxide, sodium bicarbonate, sodium carbonate, and calcium carbonate. The resultant solution is fractionally distilled under subatmospheric pressure, and the 2,5-dimethyl-2-formyl-tetrahydropyran-5-ol and 2,5-dimethyl-2-hydroxyadipaldehyde present therein are separately recovered.

According to the invention, the neutralized reaction mixture from the hydration reaction containing the 2,5-dimethyl-2-hydroxyadipaldehyde—or, if desired, the 2,5-dimethyl-2-hydroxyadipaldehyde isolated from the mixture—then can be hydrogenated, preferably under superatmospheric pressures of around 100 to around 2,000 pounds per square inch, and at temperatures within the range from 25° C. to 175° C. in the presence of a hydrogenation catalyst of well-known type, such as Raney nickel, Raney cobalt, copper chromite, etc., for periods of 1 to 100 hours. The crude hydrogenation reaction mixture then is fractionally distilled under subatmospheric pressure, and the 2,5-dimethyl-1,2,6-hexanetriol present therein and produced by the hydrogenation is separately recovered.

The following examples serve to illustrate the invention:

EXAMPLE 1

A mixture of 302 grams of alpha-methacrolein dimer (2.16 moles), 604 grams of dioxane, 252 grams of water and 50 cc. of 0.5 N sulfuric acid was refluxed 7.5 hours at a temperature of 95° C. The resultant solution was cooled and neutralized with 50 cc. of 0.5 N aqueous sodium hydroxide solution. Analysis of the crude product established that 2.99 equivalents of aldehyde and 0.23 mole of compounds containing double bonds were in the solution; that 89.3% of the double bonds present in the quantity of dimer charged had been hydrated; and that 45.8% of the thus hydrated dimer had undergone ring cleavage to form 2,5-dimethyl-2-hydroxyadipaldehyde. The crude reaction solution was fractionally distilled under reduced pressure, yielding the following two products. A 45% yield of 2,5-dimethyl-2-hydroxyadipaldehyde, based upon the dimer, was recovered, having the following properties:

|  | Mol. Wt. | Unsaturation by Bromination | Equivalent Weight as Aldehyde | C, Percent | H, Percent | Boiling Point, ° C., at 2 mm. of Hg Pressure | $n_D^{30}$ |
|---|---|---|---|---|---|---|---|
| Observed | 160 | Nil | 81 | 60.4 | 9.1 | 85 | 1.4641 |
| Theory | 158 | Nil | 79 | 60.7 | 8.9 | | |

Also, a yield of 37% of 2,5-dimethyl-2-formyltetrahydropyran-5-ol, based upon the dimer, was recovered. It had the following properties:

|  | Mol. Wt. | Unsaturation by Bromination | Equivalent Weight as Aldehyde | C, Percent | H, Percent | Boiling Point, °C., at 2 mm. of Hg Pressure | $n_D^{30}$ |
|---|---|---|---|---|---|---|---|
| Observed | 164 | Trace | 154 | 59.2 | 8.3 | 116 | 1.4758 |
| Theory | 158 | Nil | 158 | 60.7 | 8.9 | | |

EXAMPLE 2

*Production of 2,5-dimethyl-1,2,6-hexanetriol*

A mixture of 280 grams of alpha-methacrolein dimer (2 moles), 560 grams of dioxane, 230 cc. of water and 50 cc. of 0.5 N aqueous sulfuric acid solution was refluxed for 1.5 hours. The resultant solution was cooled to 25° C. and neutralized with 50 cc. of 0.5 N sodium hydroxide aqueous solution. The neutralized solution was hydrogenated in a bomb in the presence of 57 grams of Raney nickel at 132° C. and under a pressure of 2,000 pounds per square inch, gauge. The crude reaction mixture was fractionally distilled under subatmospheric pressure. A 41% yield of 2,5-dimethyl-1,2,6-hexanetriol was secured, based upon the methacrolein dimer charged. It had the following properties:

|  | Mol. Wt. | Equivalent Weight as 1,2-glycol¹ | C, Percent | H, Percent | Boiling Point, °C., at 2 mm. of Hg Pressure | Specific Gravity at 20°/20° C. | $n_D^{30}$ |
|---|---|---|---|---|---|---|---|
| Observed | 172 | 82 | 59.6 | 10.9 | 155 | 1.038 | 1.4760 |
| Theory | 162 | 81 | 59.3 | 10.1 | | | |

¹ Determined by the periodic acid method.

The reaction involved in the hydrogenation apparently proceeds as follows:

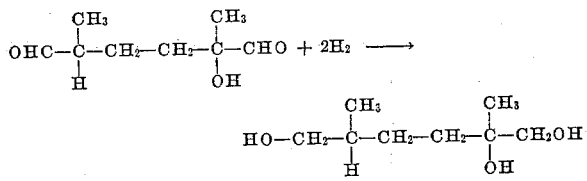

The 2,5-dimethyl-2-hydroxyadipaldehyde is a crosslinking agent similar in action to glyoxal and pyruvic aldehyde. However, unlike these two lower molecular weight dicarbonyl compounds, the 2,5-dimethyl-2-hydroxyadipaldehyde can be refined efficiently by simple distillation. Because of its three functional groups, it is a useful intermediate for further syntheses.

The 2,5-dimethyl-1,2,6-hexanetriol has uses similar to those of other polyhydric alcohols such as ethylene glycol and glycerine. It is less hygroscopic than either of these polyhydric alcohols, and is more soluble in organic solvents such as ethyl ether. Alkyd resins may be produced from the triol in the usual manner.

The 2,5-dimethyl-2-formyltetrahydropyran-5-ol possesses both reactive hydroxyl and aldehydo groups, and can be used as starting material for the synthesis of other compounds.

The invention is susceptible of modification within the scope of the appended claims.

We claim:
1. As new compounds, hydroxy derivatives of methacrolein dimer, selected from the class consisting of 2,5-dimethyl-2-formyltetrahydropyran-5-ol and 2,5-dimethyl-2-hydroxyadipaldehyde.
2. A dimethyl-2-formyltetrahydropyran-5-ol having a structure corresponding to the formula:

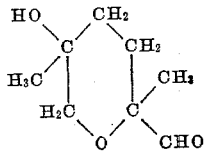

3. As a new compound, a dialdehyde having a structure corresponding to the formula:

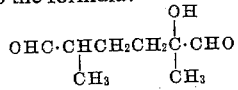

4. Process which comprises hydrating alpha-methacrolein dimer at a temperature between around 0° C., and around 150° C., in the presence of water and a strong acid catalyst, and recovering from the resultant reaction mixture at least one hydroxy compound selected from the class consisting of 2,5-dimethyl-2-formyltetrahydropyran-5-ol and 2,5-dimethyl-2-hydroxyadipaldehyde.
5. Process which comprises hydrating alpha-methacrolein dimer at a temperature between around 0° C., and around 150° C. in the presence of water and an acidic catalyst selected from the class consisting of the strong mineral acids and the strong organic acids, and recovering from the resultant reaction mixture at least one hydroxy compound selected from the class consisting of 2,5-dimethyl-2-formyltetrahydropyran-5-ol and 2,5-dimethyl-2-hydroxyadipaldehyde.
6. Process which comprises hydrating alpha-methacrolein dimer at a temperature between around 0° C. and around 150° C. in the presence of water and an acidic catalyst selected from the class consisting of the strong mineral acids and the strong organic acids and in the presence of a water-soluble inert solvent for the reactants and catalyst, and recovering from the resultant reaction mixture at least one hydroxy compound selected from the class consisting of 2,5-dimethyl-2-formyltetrahydropyran-5-ol and 2,5-dimethyl-2-hydroxyadipaldehyde.
7. Process which comprises hydrating alpha-methacrolein dimer at a temperature between around 0° C. and around 150° C. in the presence of an aqueous sulfuric acid catalyst and a water-soluble inert solvent for the reactants and catalyst, and recovering from the resultant reaction mixture at least one hydroxy compound selected from the class consisting of 2,5-dimethyl-2-formyltetrahydropyran-5-ol and 2,5-dimethyl-2-hydroxyadipaldehyde.
8. Process which comprises hydrating alpha-methacrolein dimer at a temperature between around 0°C. and around 150° C., in the presence of formic acid as catalyst and of a water-soluble inert solvent for the reactants and catalyst, and recovering from the resultant reaction mixture at least one hydroxy compound selected from the class consisting of 2,5-dimethyl-2-formyltetrahydropyran-5-ol and 2,5-dimethyl-2-hydroxyadipaldehyde.
9. Process which comprises hydrating alpha-methacrolein dimer at a temperature within the range between about 0° C. and about 150° C., in the presence of a strong acid catalyst and of a water-miscible inert solvent for the reactants and the catalyst, neutralizing the reaction mixture, hydrogenating the resultant neutralized reaction mixture at an elevated temperature under superatmospheric pressure in the presence of a hydrogenation catalyst.

(References on following page)

References Cited in the file of this patent

UNITED STATES PATENTS

| Number | Name | Date |
|---|---|---|
| 2,387,366 | Toussaint | Oct. 23, 1945 |
| 2,479,283 | Whetstone | Aug. 16, 1949 |
| 2,546,018 | Smith | Mar. 20, 1951 |

OTHER REFERENCES

Wagner: Beilstein, Chem. Ges., vol. 1, page 523 (Erste Band), Chemisches Zentralblatt (1901), I, 668.